Patented Aug. 29, 1944

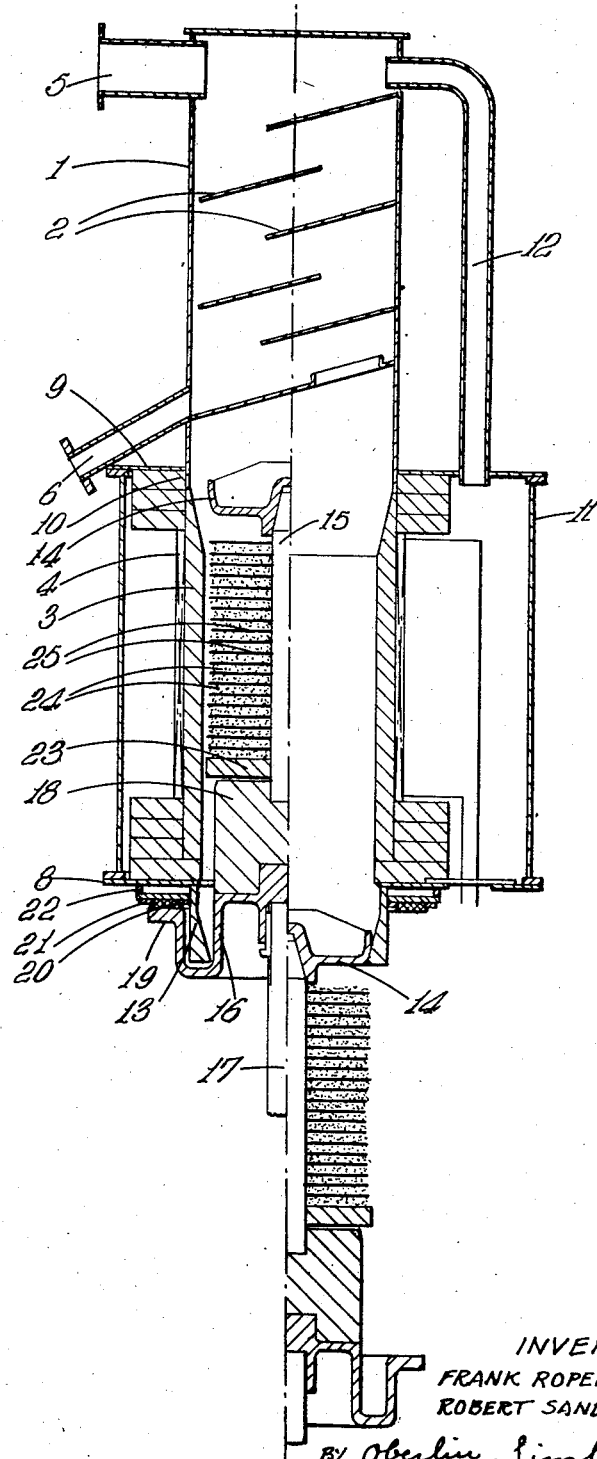

2,357,135

UNITED STATES PATENT OFFICE 2,357,135

HIGH TEMPERATURE REACTION AND FURNACE THEREFOR

Frank Roper-Lowe, Burnham, and Robert Sandison, Worsley, near Manchester, England, assignors to Magnesium Elektron Limited, London, England, a British company Application September 17, 1943, Serial No. 502,838
In Great Britain February 13, 1942

15 Claims. (Cl. 75—10)

This invention relates to high temperature reactions of the kind in which volatile substances are produced which are capable of reacting whilst hot with air and to furnaces therefor in which the reactions are carried out under reduced pressure and/or in an inert atmosphere. For example the production of metallic magnesium by reduction of magnesium ores by silicon or other reducing agents may be effected under reduced pressure and/or in a hydrogen atmosphere whereby oxidation of the magnesium vapour is avoided. One of the difficulties encountered in this process is to minimize entry of air into the furnace during removal of the reaction residues from and entry of fresh reaction mixture into the furnace whilst the furnace is hot, since this may cause considerable losses of magnesium metal by oxidation and may even give rise to ignition sometimes explosively. Loss of time and heat is involved if the furnace is cooled before it is opened to a temperature low enough to avoid serious oxidation. Attempts to produce a continuous process have involved considerable complication to maintain an inert atmosphere in the furnace whilst the reaction materials are continuously introduced into and the residues continuously removed from the furnace.

The main object of the present invention is to provide a furnace in which the reaction can be carried out under reduced pressure and/or in an inert atmosphere in a batch process and the reaction residues removed from the furnace whilst the furnace is still hot and without risk of ignition or other harmful reaction between the air and any reaction product.

According to the invention the reaction materials are heated in a reaction chamber, the volatile reaction products are condensed in a condenser connected with the upper end of the reaction chamber, the reaction residues are withdrawn as a whole downwards out of the base of the furnace whilst inert gas is introduced into the furnace to prevent ingress of air, and the lower end of the reaction chamber is closed or substantially closed whilst preparation is made for introducing a new charge through the lower end. The reaction chamber comprises a condenser in communication with the upper part of the reaction space, means whereby relative movement between the furnace chamber and the furnace can be effected so that the reaction residues can be withdrawn through the lower end of the furnace all together in a single operation, a closure member for substantially closing or completely closing the lower end of the furnace, and means whereby an inert gas is introduced into the furnace at a pressure sufficient to prevent ingress of air at its lower end.

The furnace may be of the fixed vertical shaft type and may have a plug or plunger forming the base of the reaction chamber which plunger can be removed downwards out of the furnace to bring the residues clear of the furnace for removal and for placing a further batch of reaction materials in place whereupon the plunger is moved upwards into the furnace again, means being provided to make a tight joint between the plug or plunger or some part that moves therewith and the furnace. The closure member may comprise a horizontally slidable plate or a horizontally disposed plate movable vertically in the furnace.

The "inert" gas will be inert to the products of reaction to be recovered and may be hydrogen in the case of the production of metallic magnesium by reaction of magnesite, dolomite, or other magnesium compound, with aluminum or ferrosilicon or silicon or other suitable reducing agent, or by sublimation from a mass of metallic magnesium contaminated with impurities.

The above described and other features of the invention, which features are more particularly set forth in the appended claims, will now be described by way of example with reference to the accompanying diagrammatic drawing which is a central vertical sectional view of a furnace made in accordance with the invention, the left hand side of the drawing showing the position of the parts during the reaction period and the right hand part of the drawing showing the position of the parts during the loading and unloading of the charges.

The furnace was particularly designed for the production of metallic magnesium but can be used for other reactions. The method of heating is by high frequency, or coreless, induction and for this purpose the reaction mixture is carried on a series of spaced horizontal discs of electrically conducting material in which the bulk of the heat will be generated and then transmitted to the charge by conduction, but the invention is not restricted to this method of heating.

The furnace consists of a vertical tube the upper half of which is a tubular iron condenser 1 closed at its upper end and fitted interiorly with staggered inclined shelves or baffles 2, and the lower half of which is a refractory tube 3 the interior of which comprises the reaction chamber and which is surrounded by an induction coil 4 designed to operate at a suitable frequency. The condenser thus comprises a direct continuation of the reaction chamber. The upper end of the condenser is provided with a pipe 5 which can be connected to a vacuum pump or to a supply of inert gas. The lower part of the condenser is provided with an outlet 6 through which molten magnesium can escape, the shelves in the condenser being arranged in such a way that the magnesium will flow to this outlet. The furnace has an iron base plate 8 having a circular opening corresponding with the interior of the furnace. A similarly shaped top plate 9 is welded at its inner edge 10 to the outer surface of the condenser adjacent to the lower end of the latter and a cylindrical iron wall 11 surrounds the lower part of the furnace and is welded to the base plate and top plate thereby forming with the condenser a gas tight casing for the furnace except for its open lower end. A pipe 12 connects the upper end of the condenser and the upper part of the iron casing adjacent to the top plate to ensure equalisation of pressure. The temperature of the condenser may be controlled by heating or cooling means, and if desired by a vacuum space surrounding the condenser. Welded to and depending from the inner edge of the base plate is a skirt 13 which is of slightly diminishing internal diameter towards its lower end to form a conical seating surface for the closure member 14 which closes or substantially closes the lower end of the furnace during unloading and loading of the reaction charges. This closure member has a conical seating on the upper end of a vertical rod or spigot 15 upstanding centrally on a block 18 of refractory material that constitutes the movable base of the reaction chamber. This block is carried by a plunger 16 which in turn is carried by a rod 17 adapted to be lifted and lowered by hydraulic or other suitable means not shown. The plunger 16 is shaped to extend down, around the skirt, and up to a level well above the lower end of the skirt, where it has a flange 19 that forms a gas tight seal with a packing ring 20 of rubber or other suitably resilient material. The packing ring 20 is supported by a metal ring 21 against the underneath surface of an annular water cooled chamber 22 welded to the furnace base plate and to the skirt 13.

In operation, the rod 17 is lowered to the position shown at the right hand side of the figure and a heavy primer plate 23 is placed on the refractory block 18 and alternate layers of reaction charge 24 and thin horizontal iron primer plates 25 are placed on the plate 23. The rod 17 is then raised thereby raising the closure member 14 and bringing the charge into the reaction chamber, and the plunger 16 up to the packing ring 20 to make a gas tight seal. The furnace is then evacuated and the current switched on in the coil 4 whereupon the charge becomes heated. Magnesium vapour is liberated from the charge and condensers in the condenser 1 from which it can be subsequently removed in the molten condition.

When the reaction is completed the current is switched off, connection to the vacuum pump is broken, and a supply of hydrogen introduced into the interior of the furnace through the pipe 5. The plunger 16 is then moved downwards to bring the reaction residues and the spigot out of the furnace without waiting for the furnace to cool. The iron closure plate 14 descends with the plunger 16 until it rests on the skirt 13 at the bottom of the furnace. Any hydrogen escaping between the plate and the skirt is ignited and as the packing ring 20 is well above the level of the lower edge of the skirt it will not be unduly heated. The plate 23 can then be removed together with the reaction residues and the other primer plates.

Several charges may be reacted and the magnesium therefrom condensed before melting the magnesium out of the condenser.

If desired the closure member 14 may be fixed to the spigot 15.

We claim:

1. A process for effecting high temperature reactions of the kind referred to wherein the reaction materials are heated in a reaction chamber, the volatile reaction products are condensed in a condenser connected with the upper end of the reaction chamber, the reaction residues are withdrawn as a whole downwards out of the lower end of the reaction chamber whilst inert gas is introduced into the reaction chamber to prevent ingress of air, and the lower end of the reaction chamber is closed to at least a substantial extent whilst preparation is made for introducing a new charge.

2. A furnace comprising a reaction chamber having a movable base, a condenser in communication with the upper part of the reaction chamber, means whereby relative movement between the base of the reaction chamber and the furnace can be effected so that the whole of the reaction residues can be withdrawn through the lower end of the furnace in a single operation, a closure member movable in sequence to the movement of said base for at least substantially closing the lower end of the reaction chamber when said base is removed, and means whereby an inert gas is introduced into the furnace at a pressure sufficient to prevent ingress of air at the base of the furnace.

3. A process of effecting high temperature reactions of the kind described, which comprises heating the reaction materials in a reaction zone by high frequency coreless induction, leading the volatile reaction products from the upper end of the reaction zone to a condensing zone, withdrawing the reaction residues as a whole downwardly out of the reaction zone while preventing ingress of air by introducing inert gas, and closing the lower end of the reaction zone to at least a substantial extent while preparing to introduce a new charge.

4. A process of effecting high temperature reactions of the kind described, which comprises supporting the reaction materials on a series of spaced horizontal primer plates within a reaction zone, heating the reaction materials by generating heat in the primer plates by high frequency induction, leading the volatile reaction products from the upper end of the reaction zone to a condensing zone, withdrawing the reaction residues downwardly as a whole out of the reaction zone while preventing ingress of air by introducing inert gas, and closing the lower end of the reaction zone to at least a substantial extent while preparing to introduce a new charge.

5. A process of effecting high temperature reactions of the kind described, which comprises heating the reaction materials in a reaction zone, leading the volatile reaction products from the upper end of the reaction zone to a condensing zone, lowering the base of the reaction zone to withdraw the residues as a whole while preventing ingress of air by introducing inert gas and applying a closure to the lower end of the reaction zone while preparing to introduce a new charge.

6. A process of effecting high temperature reactions of the kind described, which comprises supporting the reaction materials on a primer plate in a reaction zone, applying heat by high frequency induction, leading the volatile reaction products from the upper end of the reaction zone to a condensing zone, withdrawing the reaction residues as a whole downwardly with the primer out of the reaction zone while preventing ingress of air by introducing inert gas and applying a closure to the lower end of the reaction zone while preparing to introduce a new charge.

7. A process of effecting high temperature reactions of the kind described, which comprises heating the reaction materials inert to hydrogen in a reaction zone, leading the volatile reaction products from the upper end of the reaction zone to a condensing zone, withdrawing the reaction residues as a whole downwardly out of the reaction zone, substantially closing the lower end of the reaction zone while preparing to introduce a new charge, and introducing hydrogen at sufficient pressure to issue from the lower end of the reaction zone.

8. A process of effecting high temperature reactions of the kind described, which comprises supporting the reaction materials for producing a magnesium vapor on spaced horizontal primer plates in a reaction zone, generating heat in the primer plates by high frequency induction, leading the magnesium vapor from the upper end of the reaction zone to a condensing zone, withdrawing the reaction residues as a whole downwardly out of the reaction zone, substantially closing the lower end of the reaction zone while preparing to introduce a new charge, and introducing hydrogen at a pressure to issue from the lower end of the reaction zone.

9. A furnace comprising a reaction chamber having a movable base, an upstanding spigot on said moveable base, adapted to receive a number of horizontal primer plates which support the charge, a high frequency coil around said chamber for generating heat in said plates by high frequency induction, a condenser in communication with the upper part of the reaction chamber, means whereby relative movement between the base of the reaction chamber and the furnace can be effected so that the whole of the reaction residues can be withdrawn through the lower end of the furnace in a single operation, a closure member in association which said spigot for at least substantially closing the lower end of the reaction chamber when said base is removed, and means whereby an inert gas is introduced into the furnace at a pressure sufficient to prevent ingress of air at the base of the furnace.

10. A furnace comprising a reaction chamber having a movable base, a condenser comprising a direct continuation of the upper part of the reaction chamber, at least one baffle plate between the reaction chamber and the condenser, means whereby relative movement between the base of the reaction chamber and the furnace can be effected so that the whole of the reaction residues can be withdrawn through the lower end of the furnace in a single operation, a closure member movable in sequence to the movement of said base for at least substantially closing the lower end of the reaction chamber when said base is removed, and means whereby an inert gas is introduced into the furnace at a pressure sufficient to prevent ingress of air at the base of the furnace.

11. A furnace comprising a reaction chamber having a moveable base, an upstanding spigot on said moveable base, a closure plate carried on the upper end of said spigot, an annular seating surface at the lower end of said chamber on which flange the closure plate is adapted to rest, a condenser in communication with the upper part of the reaction chamber, means whereby relative movement between the base of the reaction chamber and the furnace can be effected so that the whole of the reaction residues can be withdrawn through the lower end of the furnace in a single operation whereupon said closure plate seats on said flange so as at least substantially to close the lower end of the reaction chamber, and means whereby an inert gas is introduced into the furnace at a pressure sufficient to prevent ingress of air at the base of the furnace.

12. A furnace comprising a reaction chamber having a movable base, a condenser in communication with the upper part of the reaction chamber, means whereby relative movement between the base of the reaction chamber and the furnace can be effected so that the whole of the reaction residues can be withdrawn through the lower end of the furnace in a single operation, a closure member movable in sequence to the movement of said base for at least substantially closing the lower end of the reaction chamber when said base is removed, means whereby an inert gas is introduced into the furance at a pressure sufficient to prevent ingress of air at the base of the furnace, an annular water cooled chamber at the lower end of the reaction chamber, a flange on the movable base, and a packing adapted to be pressed between said flange and said water cooled chamber to effect a tight closure.

13. A furnace comprising a reaction chamber having a movable base, an annular skirt extending from the reaction chamber downwardly, a condenser in communication with the upper part of the reaction chamber, means whereby relative movement between the base of the reaction chamber and the furnace can be effected so that the whole of the reaction residues can be withdrawn through the lower end of the furnace in a single operation, a closure member movable in sequence to the movement of said base for cooperating with said annular skirt and at least substantially closing the lower end of the reaction chamber when said base is removed, and means whereby an inert gas is introduced into the furance at a pressure sufficient to prevent ingress of air at the base of the furnace.

14. A furnace comprising a reaction chamber having a movable base, a skirt extending from the lower end of the reaction chamber, a flange on the movable base shaped to enclose said skirt, a condenser in communication with the upper part of the reaction chamber, means whereby relative movement between the base of the reaction chamber and the furnace can be effected so that the whole of the reaction residues can be withdrawn through the lower end of the furnace in a single operation, and a closure member movable in sequence to the movement of said base for at least substantially closing the lower end of the reaction chamber when said base is removed.

15. A furnace comprising a reaction chamber having a moveable base, an upstanding spigot on said moveable base adapted to receive a number of horizontal primer plates which support the charge, a high frequency coil around said chamber for generating heat in said plates by high frequency induction, a condenser comprising a direct continuation of the upper part of the reaction chamber, at least one baffle plate between the reaction chamber and the condenser, means whereby the base of the reaction chamber can be lowered so that the whole of the reaction residues can be withdrawn through the lower end of the reaction chamber in a single operation, an interior annular seating surface at the lower end of the reaction chamber, and a closure plate carried on the upper end of the said spigot and adapted to rest on the said surface when the moveable base is lowered so as substantially to close the lower end of the reaction chamber.

FRANK ROPER-LOWE.
ROBERT SANDISON.